June 14, 1938.  G. A. MOORE  2,120,898
PAPER CONTAINER
Filed April 17, 1934   3 Sheets-Sheet 1

INVENTOR.
George Arlington Moore
BY Charles H. Kisler
ATTORNEY

June 14, 1938.  G. A. MOORE  2,120,898
PAPER CONTAINER
Filed April 17, 1934   3 Sheets-Sheet 2

INVENTOR.
George Arlington Moore
BY Charles H Kesler
ATTORNEY

Patented June 14, 1938

2,120,898

UNITED STATES PATENT OFFICE 2,120,898

PAPER CONTAINER

George Arlington Moore, Louisville, Ky., assignor to Humoco Corporation, Louisville, Ky., a corporation of Delaware Application April 17, 1934, Serial No. 720,920

40 Claims. (Cl. 229—5.6)

My invention relates to containers composed at least in part of paper stock, or felted fibrous material of similar properties, and including a body or shell and flanged end closures or heads therefor having interlocking seams or joints at the junctions thereof, and the same has for its object to provide a simple, strong and durable article which is substantially impervious to air and moisture, and which may be fabricated at low cost under conditions preventing rupture, distortion, or other injury to the material liable to impair the efficiency of the fabricated article.

Further, said invention has for its object to provide an article of the character specified in which the interlocking seams or joints thereof are effectively locked mechanically to prevent separation or loosening of the plies thereof under stress or pressure imposed thereon in any direction.

Further, said invention has for its object to provide an article of the character specified in which certain of the parts thereof are composed of a laminated wall structure including layers of material differing in properties or characteristics but mutually contributing to enhance the strength of the structure and to maintain the deformation or shape imposed thereon.

Further, said invention has for its object to provide an article of the character specified in which said laminated parts are composed in part of a layer of a soft, readily deformable material impervious to air and moisture, such as a metal foil, and in part of a layer or layers of paper stock, the former opposing or overcoming the tendency of the paper stock to relax or lose its shape upon deformation thereof, and the latter serving to reinforce or strengthen said soft layer or metal foil and act as a cushion or protection therefor.

Further, said invention has for its object to provide an article of the character specified in which the interlocking plies or layers of the seams or joints at the junctures of the body and heads, when packed or confined into intimate contact, form a gasket for hermetically sealing said joint or seam without reliance on high pressures for welding the plies into intimate contact for effecting said purpose.

Further, said invention has for its object to provide an article of the character specified in which means is incorporated compensating for excess material in the seams or joints when said structures include curving portions, ends or corners of relatively short radii compared to the ply depth thereof.

Further, said invention has for its object to provide an article of the character specified in which the seams, joints or reinforcements thereof are made with the plies of substantial depth or overlap and of uniform shape and cross-section throughout.

Further, said invention has for its object to provide an article of the character specified in which the body or shell thereof, when of oblong or oval formation is retained in shape without sagging or bowing at the sides so that the open ends thereof form sockets of gauge dimensions and shape for receiving the end closures or heads.

Further, said invention has for its object to provide an article of the character specified in which the body or shell thereof includes inwardly directed reinforcing beads or ribs thereon serving as templates or gauges for duly centering and positioning the end closures or heads within the open ends or sockets of the shell and shaped to receive and sustain the thrust of said heads when the same are disposed within said body and interlocked therewith.

Further, said invention has for its object to provide an article of the character specified in which the flanged end closures thereof are received into the open ends or sockets of the body with a smooth, close fit without wrinkling, ruffling or buckling, the material thereof being in condition allowing the same to be folded with the body wall into an interlocking seam without detriment to the material.

Further, said invention has for its object to provide an article of the character specified in which certain of the end closures thereof are scored or weakened without impairment of the impervious character thereof to allow the same to be readily ruptured or broken in removing the contents for use.

Further, said invention has for its object to provide an article of the character specified in which a cover or cap is attached to the container for flexible swinging or hinging movement thereon without detriment to the material and is adapted to provide a close fitting engagement with the adjacent reinforced margin or seam of the container to effectively seal the same.

Further, said invention has for its object to provide an article of the character specified in which the portions of the cap or cover fitting said marginal seam of the container corresponds thereto in gauge dimensions and retains its shape and dimensions.

Further, said invention has for its object to provide an article of the character specified in which the laminated parts thereof when shaped are permanently welded or vulcanized together by a flexible or elastic adhesive compensating without loss of adhesion for stresses or strains imposed on the laminations, and serving to enhance the strength and durability of said parts and preserve the shape thereof.

Further, said invention has for its object to provide an article of the character specified in which a covering of transparent or diaphanous material impervious to air and moisture is provided for the body thereof, and preferably incorporated in the joints or seams of the container.

Other objects will in part be obvious and in part be pointed out hereinafter.

To the attainment of the aforesaid objects and ends my invention consists in the novel features of construction and in the combination, connection and arrangement of parts hereinafter more fully described and then pointed out in the claims.

In the accompanying drawings:

Fig. 15 is an enlarged transverse section, with parts broken away, showing the cap or cover attached to the body of the container, and in partly open position.

Referring to the drawings, the container comprises the body or shell 10, preferably constructed of oblong or oval shape, and the flanged end closures or heads 11 and 12 disposed therein. The body wall 10 and the flanges 13 of the heads 11 and 12 are interlocked to form multiple ply joints or seams 14 providing reinforcements at the ends of the container. The invention is applicable to containers having curved wall portions of relatively short radii, and particularly to containers including straight wall portions connected by curving end or corner portions of short radii.

A suitable cover or cap 15 is hinged at 16 to the body 10 at the upper end thereof and is adapted to engage the reinforcement 14 for supplementing the heads 11 and 12 in keeping the container hermetically sealed, and forming a closure for the open end thereof when the contiguous head is ruptured for removing the contents of the container.

Figure 1:
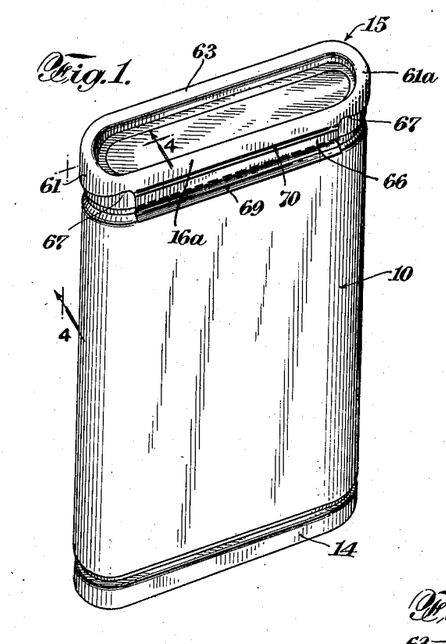
Fig. 1 is a perspective of one form of container constructed according to and embodying my said invention.
Figure 2:
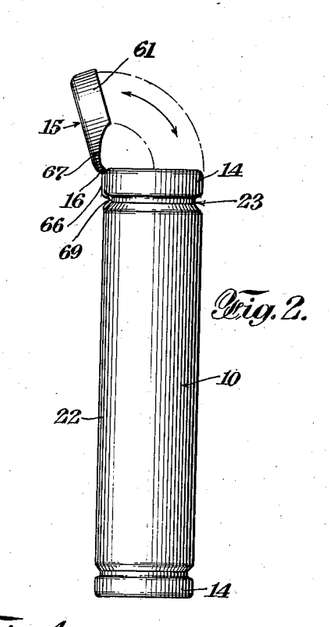
Fig. 2 is a side view thereof showing the cover in open position.
Figure 3:
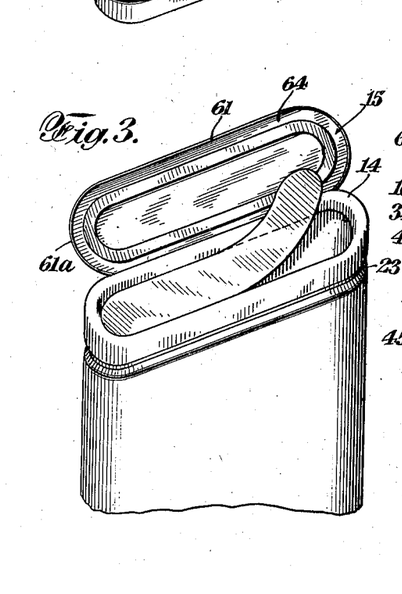
Fig. 3 is a perspective of the upper portion of the container showing one of the end closures broken or ruptured.
Figure 4:
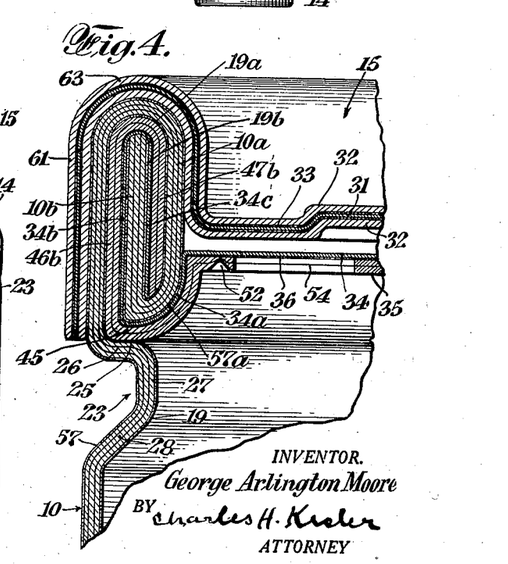
Fig. 4 is an enlarged cross-section of a portion of the container on the line 4—4 of Fig. 1.

The body 10 is preferably composed of a multiple ply structure as shown at Fig. 4, and, as an example of one way of making the same, it is preferably formed from a single blank or sheet of material 17 which is wound on a suitable mandrel or core into a multiple ply structure forming said body 10.

The blank 17 is preferably composed of a suitable paper stock adapted to be readily deformed without becoming ruptured or otherwise damaged, and the use of a fibrous material composed of relatively long fibres is preferred.

Figures 5, 6, 7, 8:
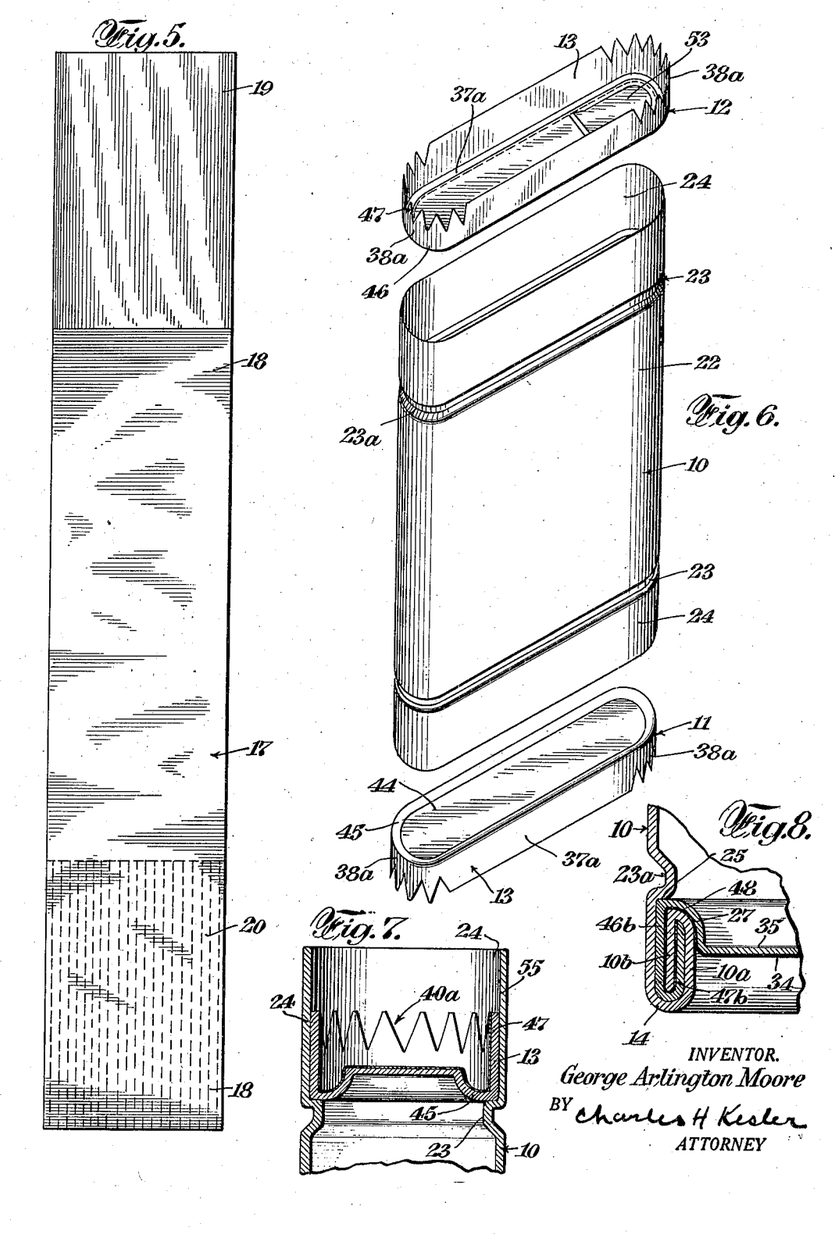
Fig. 5 is a plan of a paper strip employed in making the shell or body of the container.
Fig. 6 is an expanded perspective view of said shell and the end closures thereof.
Fig. 7 is a sectional view showing one of the flanged heads in position within the end of the body or shell ready for the seam forming operation.
Fig. 8 is an enlarged sectional detail view of the reinforced, interlocking joint or seam at the lower end of the container.

The blank 17 is of the length required to form a body of the desired number of plies and is preferably pretreated so that the body 10, when the blank 17 is wound, is substantially complete. For this purpose, the blank 17 at one side over the portion indicated by the transverse shading 18, is coated with a thin layer or film of a suitable adhesive which is allowed to dry thereon. I prefer an adhesive which does not tend to release the plies and allow the same to loosen as a result of the adhesive becoming crystalline, brittle, or friable, and I find adhesives having a mica, casein or dextrine base suited for this purpose. The same side of the portion 19 of the blank 17 (designated by the longitudinal shading) forms the inside surface of the container and may be treated with a suitable moisture proofing substance, such as paraffine which is preferably applied so as to permeate the fibres at one side of the sheet only without forming an appreciable film on the surface of the sheet. The opposite end portion 20 of the sheet which forms the outer ply of the container may have a label or matter printed on the outer surface thereof.

The oblong body 10 as thus formed tends to bow or sag inwardly at the opposite sides 22 thereof, and to obviate such bowing I reinforce the wall of the body or shell 10 by forming inwardly directed beads or ribs 23 (also forming the complementary outward grooves 23a) in the wall thereof adjacent the opposite ends thereof by means of suitable dies. The ribs 23 not only reinforce the body 10 and maintain the body walls 22 in parallelism without bowing but also insure the formation of sockets 24 at the ends of the shell 10 of predetermined or gauge dimensions for receiving the end closures or heads 11 and 12 adapted to closely and smoothly fit said sockets 24 evenly seated upon the ribs 23 to form a joint 25. The ribs 23 serve as templates or gauges for determining the positions of the end members 11 and 12 within the shell and for properly locating the same relative to the marginal edges of the body during the seam forming operation.

The ribs 23 also serve as ledges or abutments for receiving the thrust of the end members 11 and 12, during the seam forming operation and after the container is formed, and obviates the need of the use of an internal mandrel or support for the head when the seam is being formed, it only being required to support the body 10 externally by means of a contracting clamp having a bead fitting the groove 23a.

The ribs 23 in order to effectively resist the thrust or pressure thereon are made of strutted or braced formation, and, for this purpose, each comprises the ledge portion 26 extending inwardly substantially horizontally or at right angles to the wall 10, a vertical intermediate portion 27 and an inclined portion 28 merging with the vertical part 27 and the body wall 10 and being disposed at an angle of about 45 degrees to the horizontal plane and serving as a strut or brace at the inner end of the head 11 or 12 for receiving and supporting the thrust or pressure imposed thereby on the ledge portion 26 of the rib.

The heads 11 and 12 and cover 15 are preferably formed from blanks of composite laminated structure comprising layers of materials of different qualities or characteristics mutually supplementing each other in satisfying the requirements of the structure or part. Paper stock alone, for instance, is difficult to work, and once the fibrous structure thereof is modified from its natural state as by flanging, flowing, or other application of working pressure thereto it is difficult to flow or turn the material after such treatment in order to form the interlocking seam or joint, and the stresses and strains imposed on the paper by the operation tend to cause the stock to expand or relax and lose the shape imposed thereon.

I have discovered that by using laminated blanks composed of alternate layers of paper, preferably a long fibre sulphite stock which does not readily tear off in strata, and metal foil or other light sheet metal secured together by an adhesive satisfying the requirements of the process and of the product, the container forming operation can be greatly facilitated and the material can be subjected to severe working and conformed to the desired shape, and retained to such shape without becoming cracked, torn or otherwise injured. Further, in using foil or similar soft, readily deformable material the wall of the structure is rendered substantially impervious to air and moisture, and the paper layer, because of its greater tenacity or tensile strength compared to the foil, serves to reinforce and strengthen said foil to prevent injury thereto.

The flat laminated blanks as thus formed may comprise one or more layers of paper and one or more layers of foil.

Figure 9:
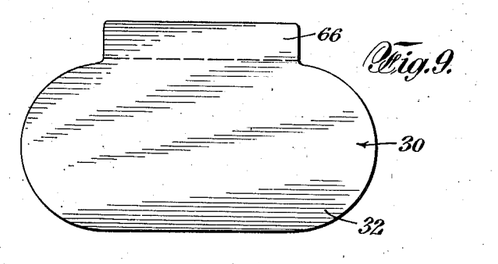
Fig. 9 is a plan of the blank from which the cover is made.
Figure 10:
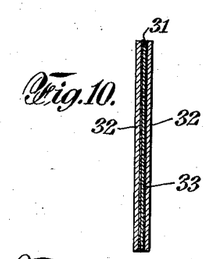
Fig. 10 is a cross-section of the laminated structure thereof.

The blank 30 (Figs. 9 and 10) is used for forming the cap 15 and comprises a layer of foil 31 interposed between the layers of paper 32, the layers being secured together by an adhesive 33 particularly suited for the purpose as hereinafter described.

The heads 11 and 12 are formed from similar blanks 30a (Fig. 12) and comprise, as shown in Figs. 4, 7, 8, and 15 a layer of foil 34 reinforced or strengthened at one side by one or more paper layers 35 secured thereto by the adhesive 36, the opposite side of the foil being exposed.

In forming the heads 11 and 12 and the caps 15 from these laminated blanks, and in folding the joints or seams 14, the layer or lamination at the outer side of the various bends turn over on a longer radius than the laminations at the inner side of the bends, and in flanging or turning over the curved marginal portions of the material the material of one lamination tends to become crowded or stretched more than the material of the other lamination in accordance with the change in radius of the curved wall portion. It is therefore necessary to compensate for this by providing an adhesive allowing the laminations to slip, yield or otherwise move over each other during the deforming operations thereon while retained in intimate contact by said adhesive so that the working stresses applied to the material will not rupture, break, tear, crack or otherwise damage the same, or cause the laminations or walls to wrinkle, buckle or become unduly irregular in outline.

I have discovered that certain substances having elastic or yielding properties, such as adhesives having bases of gutta-percha, caoutchouc or other rubber gum, for example, the substance generally known as "latex" are sufficiently flexible or resilient to yield when the material is being deformed to allow relative movement of the laminations and retain the layers in intimate contact, the product being formed without damaging the material and impairing the imperviousness thereof. I also find that "latex" or similar flexible or elastic substance or adhesive does not appreciably harden, crack or crystallize and is impervious to and unaffected by moisture, and compensates for stresses or strains imposed on the laminations without releasing the cohesion between the same so that the laminations and joints are retained in intimate contact and to shape, thereby enhancing the durability, strength, and impervious qualities of the container. In practice better results are obtained in forming the blanks by depositing a thin coat or film of the "latex" on the metal foil first and allowing the same to dry, and then coating the layer or layers of paper with said adhesive and applying the same to the foil. This appears to improve the gripping or adhesive action of the "latex", and further improvement is noted if the foil is embossed or otherwise roughened to provide anchorage for the adhesive. The heads 11 and 12 and cap 15 are preferably formed in dies with the application of heat. The heat renders the "latex" more flexible and resilient and causes the same to more uniformly permeate the fiber and juncture between the paper and the foil. Upon cooling the adhesive sets, the parts being retained in permanent shape with the laminations intimately united in a manner simulating vulcanization or welding.

Figure 12:
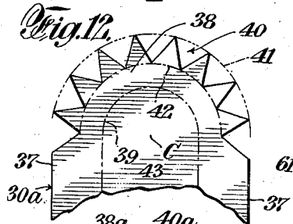
Fig. 12 is a plan of the notched blank partly broken away, from which the heads or end closures are made.

The blank 30a illustrated in Fig. 12 for forming the heads 11 and 12 comprises a laminated body having straight, parallel side portions 37 and rounded end portions 38 adapted to be drawn about the line of fold 39 to form the vertical flange 13. The outer part of the rounded marginal portion is serrated or notched, uniformly, as indicated at 40, the apices of the projections lying on an outer arc designated by the broken line 41, and the apices of the intervening spaces lying on an inner concentric arc designated by the broken line 42. The arcs 41 and 42 are drawn on radii having the center C.

Figure 13:
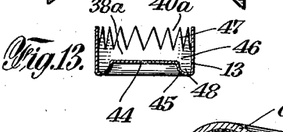
Fig. 13 is a transverse sectional view of the flanged head showing the relative sizes of the notches after the flange drawing operation.

When the blank 30a is drawn by the action of suitable dies, the central portion 43 of the blank forms the bottom 44 of the flanged head and the portions 37—38 form the vertical flange 13 including the side portions 37a and round end portions 38a. A reinforcement or bead 45 is formed by the same operation at the junction between said bottom 44 and said flange 13 as hereinafter more fully described. The rounded or curving end portions 38a thus formed each comprises a substantially continuous inner portion 46 which is not to be subjected to further folding or deformation and the non-continuous or interrupted marginal portion 47 which is to be infolded into interlocking relation with the marginal portions of the body wall 10 as hereinafter described. The continuous portion 46 corresponds with the portion of the blank between the lines 39 and 42, and the interrupted portion 47 corresponds with the portion of the blank between the lines 41 and 42. In drawing the flange the radius of the rounded margin of the blank, represented by the line 41, is substantially reduced to the radius of the curved end portions of the line of fold 39 which determines the curvature of the flange 13 at the ends. The edges of the notches 40 of the blank as indicated in Fig. 13 are drawn towards each other to form notches 40a of reduced size compensating for the reduction in radius. It will be noted that the flange 13 is of substantial depth compared to the radius of the rounded or curved end portions thereof to provide ample material to be infolded in forming the seams 14.

When flanged heads of paper are ordinarily drawn from a flat blank the resulting reduction in radius tends to crowd or compress the excess material at the marginal portion of the flange causing the flanges to expand or flare out. In my invention the foil layer 34 supplements the notching in opposing the tendency of the paper layer to expand and maintains the entire flange 13 substantially vertical. The notching 40a is particularly beneficial because it prevents buckling, wrinkling or ruffling of the flange, particularly in the straight portions 37a thereof, when the heads 11 and 12 are inserted within the body 10, as shown at Fig. 7, the heads fitting the sockets 24 smoothly and evenly throughout to allow the seam or joint to be properly formed.

In drawing flanged heads in ordinary practice without the preliminary notching of the blank, the curved wall portions when of substantial depth compared to the radius thereof become thicker to compensate for the excess material, and when said walls are laterally compressed in the drawing operation the material of the wall becomes highly compressed, hardened and embrittled, rendering the same incapable of being turned over or flowed in forming the seam without breaking or causing the fibers to lose their cohesion and ravel. The notching 40 also allows the flange 13 to be drawn without causing the foil to ruffle or pleat in compensating for the excess material thereof upon reduction in radius. If such foil pleating or ruffling were allowed in the outer portion 47 of the flange it would be impossible to turn the part 47 inwardly and downwardly in forming the seam without breaking or perforating the foil at the junctions of the intersecting folds or bends.

The notching 40 on the rounded ends of the blank 30a and the reduced notching 40a on the rounded marginal portions 47 of the flange allow such portions to be formed without stressing, embrittling, or ruffling the material, and provides a head which will not buckle when seated in the body sockets 24, said portion 47 being readily foldable or flowable for forming the seam. The continuous portion 46 (Fig. 13) is made relatively stiffer and more rigid since such portion is not to be subjected to further flowing or deformation operations.

Figure 14:
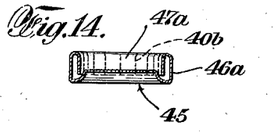
Fig. 14 is a similar view showing how the edges of the notches draw together when the flange is turned over in forming the seam.

In the present invention the notches 40 are of size compensating for reduction of radius in forming the flange and for reduction in radius resulting from the turning over of the portion 47 in forming the seam so that the use of excess material is obviated at the rounded ends of the seam, and the entire seam or reinforcement can be made of uniform cross-section and shape to fit the cap 15. In Fig. 14 I have shown diagrammatically the turn-over ply 47a illustrating at 40b how the notch edges are drawn together to form a substantially continuous wall or ply structure without crowding of the material and bulging at the ends of the seam more than at the sides thereof.

The means 40 for compensating for excess material at the rounded portions upon double reduction in radii is particularly applicable to containers having rounded portions of relatively short radius and particularly adapted for containers formed with rounded corners or ends of such short radius when the flanges of the heads are relatively deep compared to the radius of the curved ends thereof. Marginal flange portions 47 are thus formed without injury to the material and particularly without injury to the foil, capable of being readily turned over to form one of the plies 47b of the seam and insuring the formation of a seam of substantially uniform cross-section, shape and material content entirely around the same without accumulation of excess material at the rounded ends thereof as a result of the reduction in radius of the ply portion 47a accompanying the turning over thereof.

The rib 45 of the upper and lower heads 11 and 12 serves to reinforce and stiffen the article about the margin thereof, and tends to retain the same in shape against warping due to shrinkage. The rib 45 provides a relatively deep recess or groove 48 at the inner side of the head between the bottom 44 and the inner side of the flange 13 for receiving the lower portion of the reinforcing seam 14. For this purpose the rib 45 comprises a curved or arcuate wall portion 49 of substantially 90 degrees described about a center located on the opposing inner surface of the flange wall 13 and having a radius substantially equal to the total thicknesses of the plies of the joint 14 to be received and anchored in the groove 48. The arcuate portion 49 at one end merges into a straight wall portion 50 substantially normal to the bottom 44 and at its opposite end merges into a straight wall portion 51, normal to the flange wall 13.

The rib 45 as thus constructed provides a yieldable or elastic connection between the bottom portion 44 and flange 13, compensating for shrinkage as the article dries and tending to supplement the foil 34 in keeping the flange wall 13 substantially normal to the base against outward expansion. The yieldability of the rib 45 also facilitates the insertion of the heads 11 and 12 into the sockets 24 of the shell 10 and allows, supplementary to the notched formation 40a, the members 11 and 12 to be forced into place without causing canting, buckling, wrinkling or other deformation of the flange 13 or bottom 44.

It will be noted that the outer portion of the wall 49 extends substantially tangentially over the contiguous side of wall portion 26 of the rib 23 while the wall portion 51 extends substantially parallel therewith, the two resilient rib portions 23 and 45 engaging each other to form the close fitting, resilient juncture 25 hermetically sealing the enclosure. The right-angular corner formed between the rib 45 and flange 13 closely fits in the complementary corner formed in the body wall 10 by the rib 23 so that the rib 45 cannot be dislodged therefrom after the seam is formed and anchored in the complementary groove 48 of the rib 45 as will be fully described.

The head 12 at the top of the container includes means for allowing access to the container in removing the contents therefrom. For this purpose, the paper layer 35 back of the foil 34 of the laminated structure forming the bottom 44 is scored or weakened, as indicated at 52, to form a "knock-out" 52a. The scoring 52 is preferably formed as an endless V-shaped groove extending into the fibrous material and terminating short of the foil so as not to damage the same. The groove 52 extends about said bottom at points adjacent to but inwardly from the rib 45. The foil 34 remains imperforate and impervious to air and moisture while reinforced by the scored paper layer 35, and hence the container remains sealed. A tongue 53 is secured to the foil 34 at the outside thereof, as shown in Fig. 6, in position to be grasped for tearing out or rupturing the material including the foil about the scored line 52. As shown in Fig. 4 a hole 54 is provided through the paper layer 35 through which the finger can be inserted, after rupturing the foil, for tearing out the material about the scored line 52. In the structure shown in Fig. 15 the knock-out 52a is first pushed in by the finger or thumb and then may be readily torn out and removed. Any of the several expedients above described and herein shown may be resorted to for obtaining access to the container.

In practice, the head 12 is first placed in position within the shell 10 at the top and secured thereto by the multiple ply, interlocking seam or joint 14, as shown in Figs. 4 and 15. The cap 15 is then attached as hereinafter described. After the container has been filled, the head 11 is placed into position within the shell and secured thereto by a similar seam or joint, as shown at Fig. 8.

When the head 11 and 12 is placed in position within the shell 10, as shown for example in Fig. 7, the marginal part 55 of the shell and portion 47 of the flange 13 are flowed inwardly into a loose curl over the groove 48, the part 55 forming a turned over intermediate portion 10a and an advance portion 10b extending in the reverse direction between the portion 46b and turned over portion 47b of the flange 13. By applying compacting pressure outwardly laterally, the multiple plies 10b—47b—10b are brought into contact and in alignment with the groove 48, and then by applying pressure vertically to the plies, while being laterally confined, the ends and bends of the plies are brought into engagement and the material is squeezed into the groove 48 and expanded into interlocking engagement with the walls 46b—49—50.

As shown in Fig. 4 the outside of the body 10 is preferably covered with a suitable casing, sheath, skin or film of transparent or diaphanous material 57 which is impervious to moisture. Such materials are well known and are sold under various trade names, such as "Cellophane". The inner surface of the shell 10 is likewise coated with a moisture-proofing material such a paraffine 19.

As shown in the enlarged view Fig. 4, the joint 14 comprises an interlocking multiple ply structure including the outer body wall 10, the contiguous flange ply 46b, the inwardly and downwardly directed ply or fold 10a of the body, the inwardly and downwardly directed ply 47b of the flange at the inner side of the fold of ply 10a and the reversely directed terminal portion 10b of the body interposed between the ply portions 46b and 47b and between the foil 34 thereof, the various foil portions of the head within the seam being designated at 34a, 34b, 34c.

When the sheathing 57 is employed, the marginal portion 57a thereof is embedded in the joint between the ply portions 10a—10b and the foil portions 34a—34b of the head. The paraffine layer 19 is also embedded in the joint as indicated at 19a between the inner surfaces of the ply portions of the body 10 and the inner surfaces of the flange plies, the portion 19b of the layer 19 being in contact with the foil portion 34c centrally within the joint. The paraffine or other layer 19 deposited on ledge 26 or impregnating the material thereof, serves to form a tighter joint at the junction 25 where the resilient beads 23 and 45 engage each other under pressure, the bead 45 biting into the waxed material of the ledge 26.

The soft foil plies 34a—34b—34c are brought by the compacting pressure applied to the seam in directions at right angles to each other into close contact with the contiguous ply portions to form a gasket seal effectively preventing passage of air or moisture through the seams at the juncture of the plies.

The width and the depth of the groove 48 allow the plies to be forced into interlocking relation thereto upon application of pressure lengthwise of the plies. The parallel or straight portions 46b—50 of the groove 48 serve to prevent rocking or swinging of the interlocked end of the plies on the 90 degree arc of the wall portion 49 out of engagement with the groove 48, the plies, in effect, being keyed within said groove 48 against movement. The depth of the groove 48 is such that the extended plane of the bottom 44 intersects all of the parallel plies of the seam including the notched ply 47b which is embedded between the ply portions 10a—10b of the inturned body and has the end thereof extending into the confines of the groove 48. When thus embedded the rounded notched end portions 47a form substantially a continuous structure as shown in Fig. 14.

The interlocking structure provided at 48 resists stress or pressure on the plies in all directions. The bottom 44 serves as a brace or strut disposed inside of the seam body to resist inward movement or loosening of the plies thereof. Stress on the plies directed lengthwise thereof in either direction is resisted by the engagement between the loops or bends and complementary ends of the plies.

The ribs 23 also effectively resist axial movement of the heads or bowing thereof under pressures or stresses applied lengthwise of the plies, or axially of the container, and the right angular interengagement between the outer corner of the rib 45 and the complementary corner formed by the rib 23 is effective to prevent the head 11 or 12 from becoming dislodged from or disengaging the ledge 26 when bending and canting strains are imposed thereon. Hence, the bead 23 and bead 45 cooperate to resist stresses and strains imposed on the container liable to cause distortion of the lock 45 and allow the seam plies to be released therefrom and loosened.

The cap or cover 15 is formed from the laminated blank 30 by means of dies, and the material is subjected during the operation to the action of heat which causes the laminations to be welded or vulcanized together by the adhesive used to produce a strong, stiff, durable structure of permanent, gauge dimensions corresponding with the dimensions of the reinforced mouth 14 of the container.

The cover 15 comprises a flat central portion or bottom 58 and an offset reinforcement or bead 59 surrounding the flat portion 58. The marginal portion of the blank about the bead 59 is drawn in opposite directions to form the inner vertical flange portion 60 and the outer reversely directed vertical flange portion 61 connected together by an arcuate bend 62. The reverse flange as thus drawn forms an endless marginal bead 63 having a complementary groove or recess 64 therein substantially identical in shape with that of the rounded marginal portion 65 of the reinforcement 14.

The cover 15 at the back thereof is provided with a tail or tongue 66 constituting an extension of the back portion 16a of the bend 62, the skirt 61 being cut away at opposite sides of said tail 66, as indicated at 67, to allow the cover to clear the reinforcement 14 at the back in swinging, and to render the portion 16a free to flex for facilitating the swinging movement.

The anchorage of the cap 15 to the back of the container is accomplished by applying a cement, as indicated at 68 (Fig. 15), to the inner side of the tail 66 and attaching the cemented tail by pressure to the back surface of the seam 14. The die employed for this operation forms a highly compressed marginal bead 69 at the lower edge of the tail and forces the same into the groove 23a of the body. The interengagement between the parts 23a and 69 provides a mechanical anchorage, supplementing the cement 68 in resisting stresses on the cover 15 when the same is opened and closed. The tail 66 below the juncture thereof with the portion 16a is subjected by said die to high compression to cause the formation of a depression 70 composed of highly compacted, stiffened material. When the tail 66 is thus cemented and anchored to the container by pressure, the stiffened area 70 determines the location of the line of bend, fulcrum or hinge 16 of the cover, and the line of connection for the flexing strap-like hinge portion 16a. The line 16 lies in a plane passing substantially through the centers of the curved portions 65, i. e. is located at the lower outer terminus of the curved marginal portion 16a. The curved portion 16a in flexing when the cover is swung allows play thereof for facilitating the engagement of the cover with and disengagement thereof from the margin or mouth 14 of the container, and also reduces the strain on the anchorage.

The transverse width of the groove 64 is slightly less than the thickness of the reinforcement 14 while the curved portion 62 when the cover is closed and the curved portion 65 are substantially concentric, the parts fitting closely with a resilient engagement like a gasket.

As illustrated in Fig. 15, in closing the cover 15 about the axis 16, the forward portions of the skirt 61 will clear the rounded marginal portions 65 of the mouth of the container, as shown, and when the cover is closed with said reinforcement 14 fitting in the groove 64, as shown for example in Fig. 4, the walls 60—61 although relatively stiff and rigid, will resiliently yield and the multiple ply reinforcement will be compressed enough to allow the parts to fit each other with a resilient gasket-like engagement, forming a hermetically sealed closure.

When the cover is closed the inner flange portion 60, reinforced and trussed by the transverse reinforced center portion 58—59 is squeezed tightly into engagement with the inner side of the reinforcement 14 to close the mouth of the container like a stopper, and said beaded marginal portion 63 straddles the multiple ply structure of the reinforcement 14 and tends to squeeze the plies thereof into and retain the same in close engagement.

The cap 15 also functions when the knock-out 52a is removed to retain the container hermetically closed and the plies of the reinforcement 14 in engagement with each other and to reinforce the same. The cap also serves as a forming die for restoring the original gauge form of the reinforcement 14 should the same become deformed in removing the knock-out 52a.

In my invention the obtaining of caps of permanent, predetermined gauge dimensions, corresponding to the gauge dimensions of the reinforced mouth or seam 14 of the container, is made possible by constructing the walls of the cap of laminated material including paper and foil 31 or other light sheet metal capable of being deformed and retained to shape. A flange drawn from a blank composed solely of paper stock, tends to flare out and lose its shape, and this would be particularly true when the flange has curving portions in which the radius is reduced as described above in connection with the heads 11 and 12. When a curving flange is drawn from a flat blank, the excess material, due to radius reduction, is concentrated and compressed in the marginal portions of the flange, causing the material to become hard, dense, and brittle and unlikely to hold its shape upon application of pressure thereto unless reinforced in the manner herein shown and described.

I have described above how the gauge dimensions of the bead, seam or mouth 14 of the container are predetermined and made uniform throughout, and the novel expedients relied on in forming such uniform reinforcement 14. By including laminations of both paper and metal or foil in the head 12 and cap 15, the seam 14 and cap 13 can be retained permanently to shape and of corresponding permanent gauge dimensions so that when the cover is closed the parts resiliently interfit to maintain a hermetic seal impervious to air and moisture.

Figure 11:
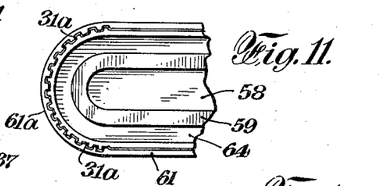
Fig. 11 is an enlarged bottom plan of a portion of the cap.

The laminated structure of the flange 61 at the rounded or curved ends 61a thereof particularly satisfies the requirements for gauge dimensions and permanency of shape. When such portions are drawn the radius of the resulting flange is reduced and the surplus material is concentrated therein making a hard, dense structure. The foil component or lamination however, when the flange is drawn corrugates or pleats at the rounded ends 61a because of the excess material, as indicated at 31a (Fig. 11). When the corrugated structure 31a is formed, the contiguous paper laminations secured thereto by the elastic adhesive, such as by the "latex" above described, intermesh or interlock with the corrugations 31a of the foil, and such interlocking laminations become, because of the heat applied, welded or vulcanized together by the adhesive to form a solid, stiff structure not liable to expand outwardly and lose its shape, such as would be the case if paper stock were used without the foil lamination. The foil 31 incorporated in the structure of the cap 15 overcomes or opposes the natural tendency of the drawn paper component to expand or flare outwardly, making it possible to produce a cap of permanent gauge dimensions having a tight fitting, gasket-like interengagement with the reinforcement 14.

The laminated structure of the cap 15 including the use of flexible foil and a flexible adhesive insures the formation of a flexible hinge at 16a capable of being flexed repeatedly without material deterioration or breakage thereof, the paper and foil components cooperating to form a strong, durable, flexible hinge, although either material, if used alone, would be unsatisfactory for the purpose.

In my invention, the structure of the container is particularly adapted for fabrication in quantity and at low cost, and the container as thus constructed is strong and durable, of light weight and of pleasing appearance, and substantially impervious to air and moisture, forming a hermetically sealed package capable of preserving the contents thereof in condition for long periods. The container includes means for allowing access thereto in removing the contents, and a cover capable of interfitting with the mouth of the container to enhance the hermetical qualities thereof and protect the contents when the contiguous head is ruptured or torn out to allow access to the container.

By constructing the heads in accordance with my invention the resulting seams including the rounded end portions thereof are made of uniform gauge dimensions, obviating the difficulty of making such uniform reinforcement when the container is of oblong or oval shape or has curved portions of relatively short radius.

In my invention the paper stock of the cap and heads is reinforced or supplemented by the use of metal or metal foil so that such parts when drawn and flanged retain their shape without danger of expanding or flaring, and the walls thereof are rendered impervious to air and moisture because of the imperforate character of the foil.

Having thus described my invention what I claim and desire to secure by Letters Patent is:

1. An article of the character described comprising a body including fibrous material, a flanged head disposed therein, the marginal portions of the body and flange being infolded to form a multiple ply interlocking seam, and including means for maintaining the dimensions thereof substantially uniform throughout, and a cover composed of laminated paper and foil and shaped to receive said seam and elastically engage the same.

2. An article of the character described comprising a container body having a head including a layer of foil and a layer of paper secured together, said paper being weakened to provide a knock-out in said head after the foil is secured to the paper.

3. A container comprising a body having an inwardly projecting rib therein providing an outward groove, a flanged head within the container engaging said rib, the marginal portion of said body and flange forming a reinforcing seam, and a cover movably connected to said seam and having a portion anchored in said groove.

4. A container comprising a body having a reinforced margin and groove at the base of said margin, and a cover coacting with said reinforced margin, said cover having a portion rigidly secured to said reinforced margin and anchored in said groove, and a flexible hinging connection between the cover and said anchored portion.

5. A container comprising a shell, and a flanged head disposed within the shell and composed of a layer of paper at the inside of the container and an outside layer of deformable, pliable, impervious, and less tenacious material serving to retain the head in set formation closely engaging the shell and to render the wall thereof impervious to air and moisture, said paper layer having a weakened line therein leaving the outside layer of less tenacious material substantially intact to form a knock-out therewith maintained by said outside layer in substantially impervious condition.

6. A container comprising a shell, and a laminated head disposed therein and composed of paper and impervious foil intimately united by an adhesive, the paper lamination having a cut therein terminating contiguous to the adhesive and leaving the foil lamination at the cut substantially intact to preserve the imperviousness of the head.

7. A container comprising a shell, and a head therein composed of paper and foil laminations, including a base portion, a flange portion and an intermediate yieldable portion, the paper component about the periphery of said base portion being weakened leaving the foil component substantially intact to form a knock-out protected against stress by said surrounding yieldable portion.

8. A container comprising a shell, and a head secured therein including a flange, a transverse base portion and an intermediate rib portion merging with said base portion substantially at an angle thereto, said portions being composed of intimately united laminations of paper and foil, the paper component of the base portion having a cut therein contiguous to said rib portion leaving the foil component substantially intact, and the angularly extending inner part of said rib portion at the cut thereof forming means for causing the foil to shear substantially on a line with said cut when pressure is applied to the weakened portion.

9. A container comprising a shell including fibrous material and having a reinforced, thickened marginal portion, and a cap including fibrous material having a depending tongue portion secured to the outside of said reinforced margin to form a flexible hinge for said cap, said flexible hinge including a pliable component reinforcing the more brittle fibrous component thereof for rendering the hinge endurant.

10. A container comprising a shell including fibrous material, a flanged head comprising fibrous material disposed within said shell and having a groove at the inner side thereof about the base of the flange, said shell and said flange being intercalated to form a multiple ply, reinforcing seam anchored in said groove, and a cover comprising fibrous material having a marginal flange portion for engaging said seam and a flexible hinge portion secured to the outer surface of said reinforcing seam.

11. A container comprising a shell having a relatively thickened reinforcement at the end thereof, and a cover including a base portion, a marginal flange portion engageable with said reinforcement, and a depending tongue portion at one side of said cover of relatively greater depth than the contiguous parts of the flange portion, said tongue portion being cemented to the outer surface of said reinforcement and interlocking at the lower edge thereof with said shell, and having a line of relatively greater consolidation adjacent to the juncture thereof with the body of the cover to locate the line of bend of said cover substantially at said juncture.

12. A container comprising a shell of fibrous material having straight and arcuate wall portions, inwardly directed rib portions formed therein adjacent to one end thereof to form a socket of substantially gauge dimensions and provide an exterior groove, a head including a central base portion, a flange portion and an intermediate portion extending rearwardly and outwardly from said base portion and merging with said flange portion at the base thereof to form a groove at the inner side of the head and a rib at the outer side thereof, said head consisting of a body wall of paper and foil laminations for retaining said head in set formation, and disposed within said socket with said rib thereof in engagement with the rib portions of the shell and with the flange portion thereof in close fitting relation with the inner surface of said shell, the marginal portion of said shell and said flange portion being intercalated to form a multiple ply seam reinforced by said foil component and anchored within the groove of the head to form a seam of substantially gauge dimensions, and a cover including a reinforced central base portion, oppositely directed marginal flange portions forming a groove therebetween corresponding to said seam in shape and adapted to fit the same and a depending tongue portion secured to the outer side of one of the straight seam portions by an adhesive and anchored in said exterior groove, said tongue portion providing a flexible hinge at the juncture thereof with the seam engaging portion of the cover.

13. A container comprising a tubular shell including fibrous material, and a head disposed therein including a base portion, a marginal flange portion and an intermediate portion extending rearwardly and outwardly from the periphery of said base portion and merging with the base of said flange portion to form a groove therebetween, said head being composed of laminations of fibrous material and foil, the foil lamination reinforcing the fibrous component of the groove and flange to maintain the configuration thereof and rendering the wall of said head substantially impervious to air and moisture, and a seam composed of interlocking portions of the shell and flange including an inturned part anchored in said groove.

14. A container comprising a tubular shell including fibrous material having inwardly directed rib portions drawn from the body wall and including a substantially right angular, reenforced flat shoulder, and a head comprising fibrous material and including a base portion, a flange and an intermediate arcuate portion extending rearwardly and outwardly relative to said base portion and merging with said flange substantially in right angular relation thereto and forming a groove therewith, said head being disposed within said shell and having the corner formed by said arcuate portion and said flange seated against said shoulder, and a seam including intercalated portions of the margin of said shell and said flange having an inturned part thereof extending into and anchored in said groove.

15. A container comprising a tubular body including fibrous material and having opposing straight wall portions connected by arcuate wall portions, the latter having a relatively greater inherent rigidity than the former, inwardly directed rib portions formed in said opposing straight wall portions adjacent to an edge thereof and extended into said arcuate portions to provide a reenforcement opposing warping of said straight portions, and a closure seated against said rib portions within said shell.

16. A container comprising a shell including fibrous material having straight and arcuate wall portions including means for reinforcing the straight wall portion to form an end socket, and a flanged head of corresponding shape drawn from a blank comprising fibrous material and including means for retaining the head in set formation, said head being disposed within said socket and including straight and arcuate flange portions, and the shell wall being folded inwardly about the flange wall to form a multiple ply seam.

17. A container comprising a tubular shell including fibrous material having straight and arcuate wall portions, and a flanged head of corresponding shape drawn from a blank comprising fibrous and foil laminations, said head being disposed within said shell and having the flange thereof in close fitting relation with the inner surfaces of said shell.

18. A container comprising a tubular shell including fibrous material and having relatively straight wall portions and connecting arcuate portions, the former tending to bow relatively to the latter, inwardly directed rib portions formed in said straight wall portions adjacent to the opposite ends thereof for opposing said bowing tendency and forming sockets at the ends of the shell, and flanged heads each drawn from a blank comprising a layer of fibrous material and a layer of inelastic, deformable material, and heads being disposed within said shell against said rib portions and having the flanges thereof in close fitting contact with the inner surfaces of said sockets.

19. A container comprising a tubular shell including laminated fibrous material and having inner and outer coverings of greater impermeability than the intermediate laminations, laminated flanged heads comprising layers of fibrous material and of a material of greater impermeability than said fibrous material and disposed within said shell at opposite ends thereof, and multiple ply seams formed from the marginal portions of said shell and the flanges of said heads including the impermeable components thereof.

20. A container comprising a shell including fibrous material and having inner and outer coverings of relatively greater impermeability to form an impervious wall, and flanged heads each having a groove formed therein between the flange and the base of said head, and comprising a lamination of fibrous material reinforced by a lamination of foil to form a substantially impervious wall and retain the head including the flange and groove thereof in substantially set formation, said heads being disposed within said shell at the opposite ends thereof and having the flanges in close fitting relation with the inner surface of said shell, the marginal portions of said shell and said flanges being intercalated to form seams each having the coverings and foil lamination embedded therein and the inturned part anchored within said groove.

21. A container comprising a body having an inwardly projecting rib formed therein adjacent an end of the body, and a head including a central portion, a flange portion, and a rib formed between said central portion and said flange portion to provide a complementary groove in the outer face of the head, said head being disposed within the body with the head rib in engagement with the body rib, and the marginal portions of the body and head flange portion infolded to form a seam anchored within said complementary groove.

22. In a container, a closure therefor, and a seam formation between the closure and side wall of the container, said formation including a flexible arched ledge, and a hatch in the closure formed by a furrow adjacent said ledge, said ledge having a sharp shoulder to provide a shearing edge when the hatch is opened.

23. In a container, a body comprising a plurality of layers of fibrous material, a flanged closure for one end of said body, the flange of said closure and the marginal portion of said body being sealed to form an impervious seam, a closure for the other end of said body having a frangible transverse portion adapted to be broken by digital pressure, and a flange portion pressed into intimate contact with the inner wall of said body, and a cover for said other end of the body operatively secured to the latter and having a flange portion adapted to slidably engage the outer surface of said body.

24. In a container, a laminated body comprising a plurality of layers of fibrous material and having two straight parallel walls connected by arcuate walls, a flanged closure for the lower end of said body, the flange of said closure and the marginal portion of said body being sealed to form a closure seam, means for closing the upper end of the body, said means having a frangible portion adapted to be broken by digital pressure, and a flanged cover operatively secured to one of the straight walls of said body adjacent the upper end thereof for retaining the contents of the container after said frangible closure means has been broken.

25. A container comprising a fibrous oblong body formed from a blank wound into a plurality of layers, the portion of the blank forming the inside surface of the container having an impervious coating applied thereto before the blank is formed into a body, metallic closure members secured to the upper and lower ends of the body, the upper metallic member being pivotally secured to the body, and an impervious head within the body adapted to be broken by digital pressure when the contents of the container are to be used, the pivoted cover being adapted to retain the contents of the container after said head has been broken.

26. A container comprising a tubular shell including laminated fibrous material and having a covering of greater impermeability than the intermediate laminations, a laminated flanged head composed of layers of fibrous material and of a material of greater impermeability than said fibrous material secured to said shell adjacent one end thereof, and a multiple ply seam formed from the marginal portion of the shell and the flange of said head including the impermeable components thereof.

27. A container comprising a shell including fibrous material, and a cover therefor comprising fibrous material and having a depending tongue portion secured to said body and forming a flexible hinge for said cover, said hinge including a pliable component reinforcing the fibrous component thereof for rendering the hinge endurant.

28. A container comprising a body including fibrous material, and a cover for said body formed from a blank comprising fibrous material and having a depending tongue constituted by a portion cemented to said body and a flexible portion between said cemented portion and the remainder of said cover.

29. A container comprising a shell, and a pivoted cover therefor including fibrous material, said cover having a base portion, a marginal flange portion engaging with the margin of said shell and a depending tongue portion, said tongue portion being cemented to said shell and having a deformation to locate the line of bend of said cover during pivotal movement thereof.

30. A container comprising a shell including fibrous material, and a cover therefor including fibrous material and having a marginal flange portion slidably engaging the margin of said shell and a flexible hinge portion cemented to the margin of said shell.

31. In a container, a body, a flanged head in said body, the margin of said body and the flange of said head forming a reinforcing seam, and a pivoted cover comprising fibrous material having a marginal portion for engaging said seam and a flexible hinge portion secured to the outer surface of said body.

32. In a container, a body comprising fibrous material, a flanged head comprising fibrous material in said body, the margin of said body and the flange of said head forming a multi-ply reinforcing seam, and a cover comprising fibrous material hingedly secured to said body and shaped to receive and yieldingly engage said seam.

33. In a container, a body comprising fibrous material, a flanged head comprising fibrous material in said body, the margin of said body and the flange of said head forming a multi-ply reinforcing seam, and a pivoted cover for said body including fibrous material, said cover having a central base portion, a marginal flange portion engageable with said seam and a depending tongue portion, said tongue portion being cemented to said shell and having a deformation to locate the line of bend of said cover during pivotal movement thereof.

34. A container comprising a shell, and a flanged head disposed within the shell and comprising a layer of paper and a layer of deformable, pliable, impervious and less tenacious material serving to retain the closure in set formation closely engaging the shell, said paper having a weakened line therein leaving said layer of less tenacious material substantially intact to form a knock-out.

35. A container comprising a tubular shell including fibrous material and a flanged head disposed therein, said head being composed of laminations of fibrous material and foil, the foil component reinforcing the fibrous component of the flange and rendering the wall of said head substantially impervious to air and moisture and the marginal portion of said shell being infolded into overlapping relation with the flange of said head.

36. In a container, a tubular shell comprising fibrous material and having straight and arcuate wall portions, and a flanged head of corresponding shape drawn from a blank comprising fibrous material and a material of greater impermeability, said head being disposed within said shell and having the flange thereof in close fitting relation with the inner surface of said shell and the marginal portion of said shell being folded inwardly about the flange to form a multiple-ply seam.

37. In a container, a tubular shell comprising fibrous materials and a covering of greater impermeability than said fibrous material, said shell having straight and arcuate wall portions, and a flanged closure of corresponding shape drawn from a blank comprising fibrous material and a material of greater impermeability than said fibrous material, said closure being disposed within said shell and having the flange thereof in close fitting relation with the inner surface of said shell and the marginal portion of said shell being folded into overlapping relation with said flange to form a multiple-ply seam.

38. In a container, a shell comprising fibrous materials, said shell having straight and arcuate wall portions and an internal rib in the wall thereof, and a flanged head of corresponding shape drawn from a blank comprising fibrous and foil laminations, said head being disposed within said shell against said rib and having the flange thereof in close fitting relation with the inner surface of said shell.

39. In a container, a body comprising fibrous material, and impervious closure means comprising fibrous and metallic components in said body, the marginal portions of said body and closure means being interlocked by curling one of said marginal portions about the other for securing said closure means in position in the body, portions of said closure means being sufficiently weak to permit disruption thereof by digital pressure to open the container for discharge of the contents thereof.

40. The combination in a container of a body comprising fibrous material and having an oblong cross section with straight wall portions connected by arcuate wall portions, and a flanged closure of corresponding shape and comprising fibrous materials, said closure being disposed within the end of said body and including straight and arcuate flange portions, the margin of said body being curled into overlapping relation with the flange of said closure.

GEORGE ARLINGTON MOORE.